(12) United States Patent
Grossman et al.

(10) Patent No.: US 7,568,404 B2
(45) Date of Patent: Aug. 4, 2009

(54) SHIFTER HAVING NEUTRAL LOCK

(75) Inventors: Patrick S. Grossman, Grand Haven, MI (US); Robert A. De Jonge, West Olive, MI (US)

(73) Assignee: GHSP, a division of JSJ Corporation, Grand Haven, MI (US)

( * ) Notice: Subject to any disclaimer, the term of this patent is extended or adjusted under 35 U.S.C. 154(b) by 801 days.

(21) Appl. No.: 11/119,871

(22) Filed: May 2, 2005

(65) Prior Publication Data

US 2006/0016287 A1  Jan. 26, 2006

Related U.S. Application Data

(60) Provisional application No. 60/591,012, filed on Jul. 26, 2004.

(51) Int. Cl.
*G05G 5/00* (2006.01)

(52) U.S. Cl. .................... 74/473.23; 74/473.21

(58) Field of Classification Search .............. 74/473.21, 74/473.23; 192/220.3, 220.4
See application file for complete search history.

(56) References Cited

U.S. PATENT DOCUMENTS

| D188,528 | S | 8/1960 | Markley, Jr. |
|---|---|---|---|
| 2,988,931 | A | 6/1961 | Markley, Jr. et al. |
| 3,104,306 | A | 9/1963 | Markley, Jr. |
| 3,572,152 | A | 3/1971 | Bruhn, Jr. et al. |
| 3,657,943 | A | 4/1972 | Bruhn, Jr. et al. |
| 3,765,264 | A | 10/1973 | Bruhn, Jr. |
| 3,774,469 | A | 11/1973 | Bruhn, Jr. |
| 3,786,690 | A | 1/1974 | Bruhn, Jr. |
| 3,828,625 | A | 8/1974 | Bruhn, Jr. |
| 3,902,378 | A | 9/1975 | Osborn |

(Continued)

FOREIGN PATENT DOCUMENTS

EP  1314916  5/2003

(Continued)

*Primary Examiner*—William C Joyce
(74) *Attorney, Agent, or Firm*—Price, Heneveld, Cooper, DeWitt & Litton, LLP

(57) ABSTRACT

A shifter for controlling a transmission of a motor vehicle includes a base structure and a shift lever that is movably mounted to the base structure for movement between a plurality of control positions. At least one of the control positions comprises a NEUTRAL position. The shifter further includes a shift gate having a plurality of notches corresponding to the control positions. The shift gate is positioned on a selected one of the base and the shift lever. The shifter further includes a movable pawl member selectively engaging the notches of the shift gate to restrict movement of the shift lever relative to the base structure. The pawl member is biased into engagement with the shift gate. A movable retaining member selectively engages the shift gate to retain the shift lever in the NEUTRAL position wherein the retaining member is biased out of engagement with the shift gate. The shifter further includes a powered actuator having a movable output member that shifts between a first position, a second position, and a third position. The movable output member operably engages the movable retaining member when in the first position and shifts the movable retaining member into engagement with the shift gate to retain the shift lever in the NEUTRAL position. The movable output member operably engages the movable pawl member when in the third position, and disengages the movable pawl member from the shift gate.

20 Claims, 11 Drawing Sheets

U.S. PATENT DOCUMENTS

| | | |
|---|---|---|
| 3,994,184 A | 11/1976 | Osborn |
| 4,245,521 A | 1/1981 | Osborn |
| 4,282,768 A | 8/1981 | Osborn |
| 4,304,112 A | 12/1981 | Osborn |
| 4,328,712 A | 5/1982 | Osborn |
| 4,343,202 A | 8/1982 | Osborn |
| RE31,451 E | 11/1983 | Osborn |
| 4,473,141 A | 9/1984 | Mochida |
| 4,515,032 A | 5/1985 | Olmsted |
| 4,569,245 A | 2/1986 | Feldt et al. |
| 4,909,096 A | 3/1990 | Kobayashi |
| 4,947,967 A | 8/1990 | Kito et al. |
| 4,977,789 A | 12/1990 | Osborn |
| 4,987,792 A | 1/1991 | Mueller et al. |
| 5,044,220 A | 9/1991 | Raff et al. |
| 5,062,509 A | 11/1991 | Carpenter |
| 5,070,740 A | 12/1991 | Giek et al. |
| 5,096,033 A | 3/1992 | Osborn |
| 5,150,633 A | 9/1992 | Hillgärtner |
| 5,167,308 A | 12/1992 | Osborn |
| 5,197,344 A | 3/1993 | Maier et al. |
| 5,211,271 A | 5/1993 | Osborn et al. |
| 5,220,984 A | 6/1993 | Ruiter |
| 5,263,383 A | 11/1993 | Meisch et al. |
| 5,275,065 A | 1/1994 | Ruiter |
| 5,277,077 A | 1/1994 | Osborn |
| 5,277,078 A | 1/1994 | Osborn et al. |
| 5,313,853 A | 5/1994 | Olmsted et al. |
| 5,314,049 A | 5/1994 | Nordstrom |
| 5,357,820 A | 10/1994 | Moroto et al. |
| 5,387,892 A | 2/1995 | Rossetti et al. |
| 5,398,565 A | 3/1995 | Brock |
| 5,400,673 A | 3/1995 | Brock |
| 5,402,870 A | 4/1995 | Osborn |
| 5,413,008 A | 5/1995 | Brock |
| 5,415,056 A | 5/1995 | Tabata et al. |
| 5,431,266 A | 7/1995 | Ito et al. |
| 5,442,975 A | 8/1995 | Osborn |
| 5,445,046 A | 8/1995 | Kataumi et al. |
| 5,465,818 A | 11/1995 | Osborn et al. |
| 5,490,434 A | 2/1996 | Osborn et al. |
| 5,493,931 A | 2/1996 | Niskanen |
| 5,494,141 A | 2/1996 | Osborn et al. |
| 5,497,673 A | 3/1996 | Kataumi et al. |
| 5,507,199 A | 4/1996 | Lampani |
| 5,556,224 A | 9/1996 | Niskanen |
| 5,588,934 A | 12/1996 | Osborn et al. |
| 5,622,079 A | 4/1997 | Woeste et al. |
| 5,626,093 A | 5/1997 | Jacobs et al. |
| 5,651,293 A | 7/1997 | Ebenstein |
| 5,666,855 A | 9/1997 | Ebenstein et al. |
| 5,677,658 A | 10/1997 | Osborn et al. |
| 5,680,307 A | 10/1997 | Issa et al. |
| 5,689,996 A | 11/1997 | Ersoy |
| 5,718,312 A | 2/1998 | Osborn et al. |
| 5,759,132 A | 6/1998 | Osborn et al. |
| 5,768,944 A | 6/1998 | Inuzuka et al. |
| 5,775,166 A * | 7/1998 | Osborn et al. ............ 74/473.25 |
| 5,791,197 A | 8/1998 | Rempinski et al. |
| 5,845,535 A | 12/1998 | Wakabayashi et al. |
| 5,861,803 A | 1/1999 | Issa |
| 5,899,115 A | 5/1999 | Kataumi et al. |
| 5,913,935 A | 6/1999 | Anderson et al. |
| 5,927,150 A | 7/1999 | Hirano et al. |
| 5,934,145 A | 8/1999 | Ersoy et al. |
| 6,038,939 A | 3/2000 | Wheeler |
| 6,059,687 A | 5/2000 | Durieux et al. |
| 6,082,217 A | 7/2000 | Wheeler |
| 6,089,118 A | 7/2000 | Ishii et al. |
| 6,098,483 A | 8/2000 | Syamoto et al. |
| 6,125,714 A | 10/2000 | Woeste et al. |
| 6,148,686 A | 11/2000 | Kataumi |
| 6,151,977 A | 11/2000 | Menig et al. |
| 6,192,770 B1 | 2/2001 | Miyoshi et al. |
| 6,196,078 B1 | 3/2001 | DeJonge et al. |
| 6,196,080 B1 | 3/2001 | Lee |
| 6,209,408 B1 | 4/2001 | DeJonge et al. |
| 6,209,410 B1 | 4/2001 | Suzuki |
| 6,223,112 B1 | 4/2001 | Nishino |
| 6,230,579 B1 | 5/2001 | Reasoner et al. |
| 6,237,435 B1 | 5/2001 | Grönhage et al. |
| 6,241,068 B1 | 6/2001 | Meyer |
| 6,260,432 B1 | 7/2001 | Ehrmaier et al. |
| 6,295,887 B1 | 10/2001 | DeJonge et al. |
| 6,311,577 B1 | 11/2001 | Wörner et al. |
| 6,325,196 B1 | 12/2001 | Beattie et al. |
| 6,382,046 B1 | 5/2002 | Wang |
| 6,401,564 B1 | 6/2002 | Lee |
| 6,405,611 B1 | 6/2002 | DeJonge et al. |
| 6,408,709 B2 | 6/2002 | Kim |
| 6,422,106 B1 | 7/2002 | Lee |
| 6,431,339 B1 | 8/2002 | Beattie et al. |
| 6,439,073 B2 | 8/2002 | Ohashi et al. |
| 6,443,024 B1 | 9/2002 | Skogward |
| 6,474,186 B1 | 11/2002 | Vollmar |
| 6,512,435 B2 | 1/2003 | Van Namen |
| 6,530,293 B1 | 3/2003 | Rückert et al. |
| 6,536,299 B2 | 3/2003 | Kim |
| 6,550,351 B1 | 4/2003 | O'Reilly et al. |
| 6,553,858 B1 | 4/2003 | Kim |
| 6,568,294 B2 | 5/2003 | Jezewski |
| 6,612,194 B2 | 9/2003 | DeJonge |
| 6,644,142 B2 | 11/2003 | Junge et al. |
| 6,658,952 B2 | 12/2003 | Hayashi et al. |
| 6,679,809 B2 | 1/2004 | Kato et al. |
| 6,732,847 B1 | 5/2004 | Wang |
| 6,761,081 B2 | 7/2004 | Kliemannel |
| 6,761,084 B2 | 7/2004 | Suzuki et al. |
| 6,773,369 B2 | 8/2004 | Altenkirch et al. |
| 6,783,480 B2 | 8/2004 | Masuda et al. |
| 6,848,331 B2 | 2/2005 | Syamoto |
| 6,848,332 B2 | 2/2005 | Hayashi et al. |
| 6,854,354 B2 * | 2/2005 | Meyer .................... 74/473.23 |
| 6,857,335 B2 | 2/2005 | Kahara |
| 6,865,967 B2 | 3/2005 | Shioji et al. |
| 7,124,874 B2 | 10/2006 | Wang |
| 2003/0098218 A1 | 5/2003 | Syamoto |
| 2003/0135321 A1 | 7/2003 | Kumazaki et al. |
| 2003/0172757 A1 | 9/2003 | Yone |
| 2003/0172762 A1 | 9/2003 | Ehrmaier et al. |
| 2003/0188594 A1 | 10/2003 | Levin et al. |
| 2003/0213327 A1 | 11/2003 | Syamoto |
| 2004/0000210 A1 | 1/2004 | Cho |
| 2004/0035237 A1 | 2/2004 | Matsui et al. |
| 2004/0045392 A1 | 3/2004 | Wakayama |
| 2004/0162185 A1 | 8/2004 | Giefer et al. |
| 2004/0168537 A1 | 9/2004 | Koontz |
| 2004/0194567 A1 | 10/2004 | Giefer et al. |
| 2004/0216546 A1 | 11/2004 | Shiomi et al. |
| 2004/0216547 A1 | 11/2004 | Shiomi et al. |
| 2004/0216549 A1 | 11/2004 | Shiomi et al. |
| 2004/0226801 A1 * | 11/2004 | De Jonge et al. ......... 192/220.7 |
| 2004/0237692 A1 | 12/2004 | Syamoto et al. |
| 2004/0237693 A1 | 12/2004 | Koide |
| 2004/0244524 A1 | 12/2004 | Russell |
| 2005/0028633 A1 | 2/2005 | Giefer et al. |
| 2005/0223835 A1 | 10/2005 | Wang |

FOREIGN PATENT DOCUMENTS

| | | |
|---|---|---|
| JP | 64458 | 1/1994 |
| JP | 2003162337 | 6/2003 |

* cited by examiner

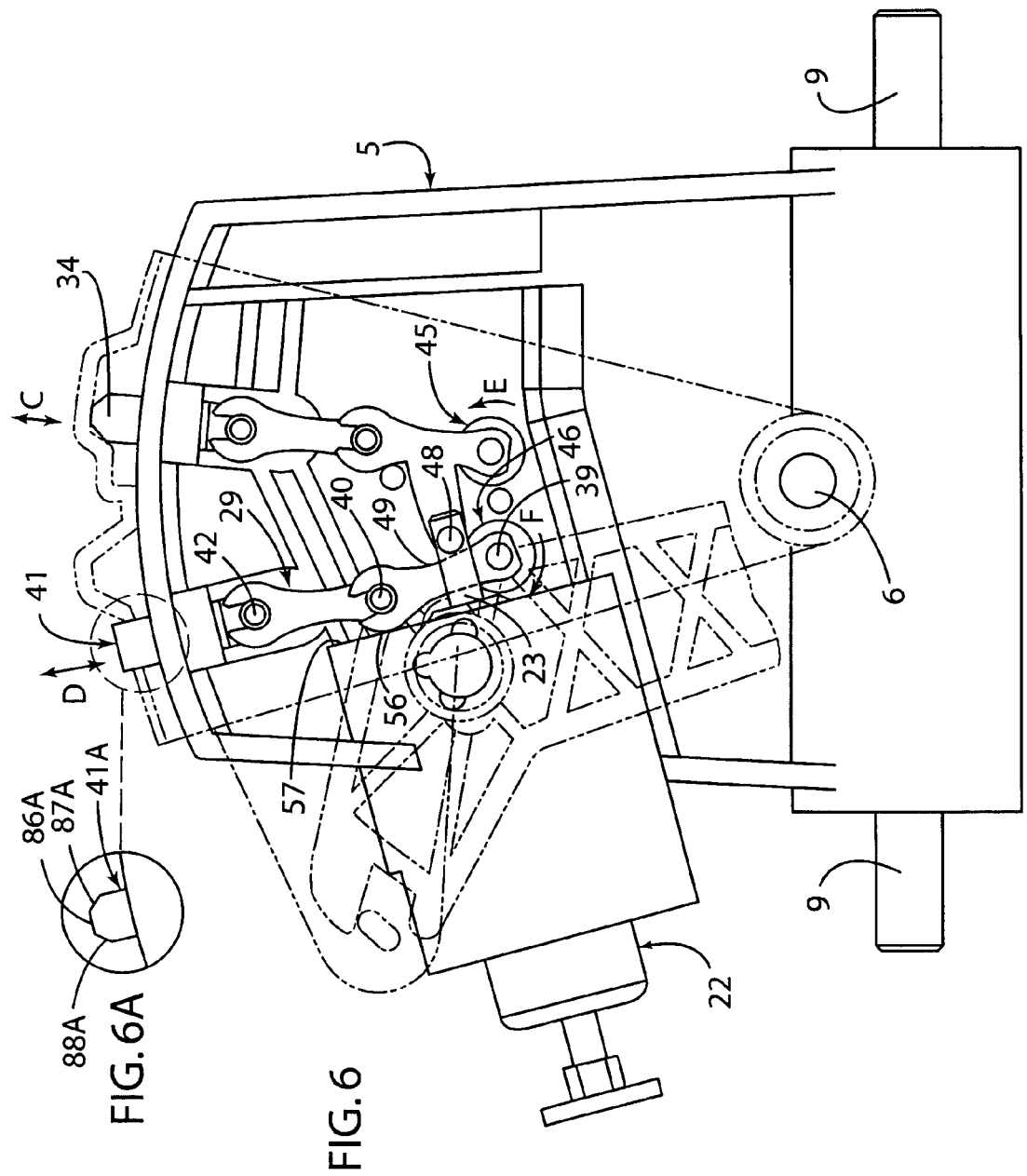

US 7,568,404 B2

SHIFTER HAVING NEUTRAL LOCK

CROSS-REFERENCE TO RELATED APPLICATIONS

The present application claims the benefit of U.S. Provisional Application No. 60/591,012, filed Jul. 26, 2004, entitled VEHICLE SHIFTER WITH POWERED PAWL HAVING NEUTRAL LOCK, the entire contents of which are incorporated herein by reference.

BACKGROUND OF THE INVENTION

The present invention relates to shifters for transmissions of passenger vehicles, and more particularly relates to shifters having devices to control movement of the shift lever between gear positions. Modern vehicle shifters may be specified or proposed to include neutral lock devices to prevent the shifters from being accidentally shifted from a neutral gear position into a reverse or forward gear position unless the vehicle is traveling at below a predetermined speed, and the brake pedal is depressed. Proposals for neutral lock devices include a second solenoid that may be similar to a park lock solenoid. The second solenoid has an extendable pin that can be extended to engage a pawl-engaging cam in a way that prevents the pawl from moving from neutral toward the reverse or drive gear positions unless predetermined vehicle conditions are met. Passenger vehicles typically may also include a park lock that prevents movement of a shift lever from a park position unless the brake pedal is depressed. Park lock devices may include a solenoid that locks the shift lever in position unless the brake pedal is depressed, and an ignition key is turned to the on or run position. One problem with this design is that solenoids are relatively expensive, and including two solenoids in a shifter results in a relatively expensive shifter assembly.

SUMMARY OF THE INVENTION

One aspect of the present invention is a shifter for controlling a transmission of a vehicle. The shifter includes a base structure and a shift lever that is movably mounted to the base structure for movement between a plurality of control positions. At least one of the control positions comprises a NEUTRAL position. The shifter further includes a shift gate having a plurality of notches corresponding to the control positions. The shift gate is positioned on a selected one of the base and the shift lever. The shifter further includes a movable pawl member selectively engaging the notches of the shift gate to restrict movement of the shift lever relative to the base structure. The pawl member is biased into engagement with the shift gate. A movable retaining member selectively engages the shift gate to retain the shift lever in the NEUTRAL position wherein the retaining member is biased out of engagement with the shift gate. The shifter further includes a powered actuator having a movable output member that shifts between a first position, a second position, and a third position. The movable output member operably engages the movable retaining member when in the first position and shifts the movable retaining member into engagement with the shift gate to retain the shift lever in the NEUTRAL position. The movable output member operably engages the movable pawl member when in the third position, and disengages the movable pawl member from the shift gate.

Another aspect of the present invention is a shifter for controlling a transmission of a vehicle. The shifter includes a base structure and a shift member that is movably associated with the base structure. The shift member is movable to a plurality of transmission control positions including at least a NEUTRAL transmission control position. The shifter also includes a shift gate defining a plurality of gear control positions. A powered pawl mechanism retains the shift member in the NEUTRAL position when actuated in a first manner, and disengages from the shift gate when actuated in a second manner.

Yet another aspect of the present invention is a shifter for controlling a transmission of a vehicle. The shifter includes a base structure and a shift member that is movably associated with the base structure. The shift member is movable to a plurality of positions including at least a NEUTRAL transmission control position and a DRIVE transmission control position. The shifter further includes a shift gate defining a plurality of positions including at least a DRIVE position. A powered pawl mechanism includes a powered actuator and a retaining member operably connected to the powered actuator. The powered pawl mechanism further includes a pawl member that is operably connected to the powered actuator. The retaining member is movable between an engaged position wherein the shift member is retained in the NEUTRAL transmission control position, and a retracted position permitting movement of the shift member relative to the base structure. The pawl member is movable between an engaged position wherein the pawl member engages the shift gate to control movement of the shift member relative to the base structure, and a disengaged position wherein the pawl member is substantially disengaged from the shift gate. The retaining member moves upon actuation of the powered actuator in a first manner, and the pawl member moves upon actuation of the powered actuator in a second manner.

These and other features, advantages, and objects of the present invention will be further understood and appreciated by those skilled in the art by reference to the following specification, claims, and appended drawings.

BRIEF DESCRIPTION OF THE DRAWINGS

FIG. 1A is an enlarged view of the shift pattern of the shifter of FIG. 1;

FIG. 6 is a side view of the shifter of FIG. 1 showing the neutral lock in the engaged position;

FIG. 6A is an enlarged view of an alternative embodiment of a portion of the shifter of FIG. 6;

DETAILED DESCRIPTION OF PREFERRED EMBODIMENT

Figure 1:
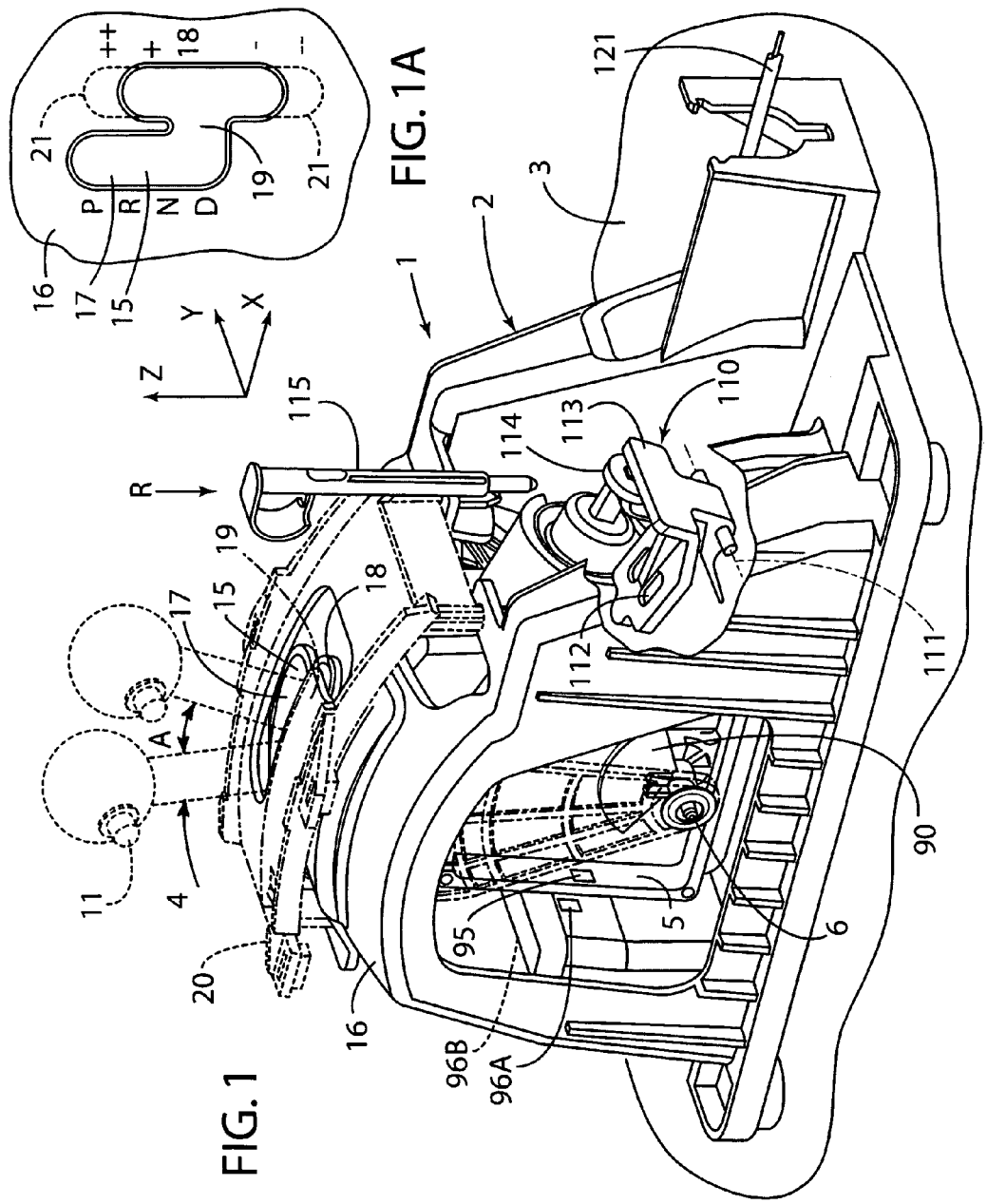
FIG. 1 is a partially fragmentary isometric view of a shifter according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A shifter 1 according to one aspect of the present invention includes a base structure 2 (FIG. 1) that is configured to secure the shifter 1 to a vehicle structure 3. A shift lever 4 includes an integral saddle bracket 7 (see also FIG. 2) including portions 8 that extend downwardly on each side of the support structure 5 to pivotably mount the lever 4 to the support structure 5 at a pivot 6 for rotation about the Y-axis (i.e., fore-aft) as indicated by the arrow "A". Support structure 5 includes pins or shafts 9 that pivotally mount the support structure 5 to the base structure 2 for rotation about the X-axis (i.e., side-to-side) as indicated by the arrow "B". An opening 15 through upper web 16 of base 2 provides a guide that limits the motion of the shift lever 4 (see also FIG. 1A). Opening 15 includes a first portion 17 forming an "automatic" shift lane having PARK, REVERSE, NEUTRAL and DRIVE positions. It will be understood that the automatic shift lane may have other configurations with additional transmission control positions, and the automatic shift lane may have additional transmission control positions, or it may have fewer transmission control positions. The opening 15 includes a second portion 18 forming a manual lane having "+" and "−" positions that upshift and downshift, respectively, the transmission by one gear. As illustrated by dashed line 21, the manual lane formed by second portion 18 may include "++" and "−−" positions in which the transmission is upshifted or downshifted by two gears. A central portion 19 of opening 15 extends between the first portion 17 and second portion 18 to form a transverse lane for moving shift lever 4 from the automatic lane to the manual lane. In the illustrated example, the first portion 17 of opening 15 forming the automatic shift lane is to the left of the second portion 18 of opening 15 forming the manual shift lane. This arrangement may be utilized for left-hand drive vehicles. Alternately, the first portion 17 of opening 15 may be to the right of the second portion 18, such that the automatic shift lane is to the left of the manual shift lane for right-hand drive vehicles. A cover 20 may be secured to the base structure 2.

Figure 2:
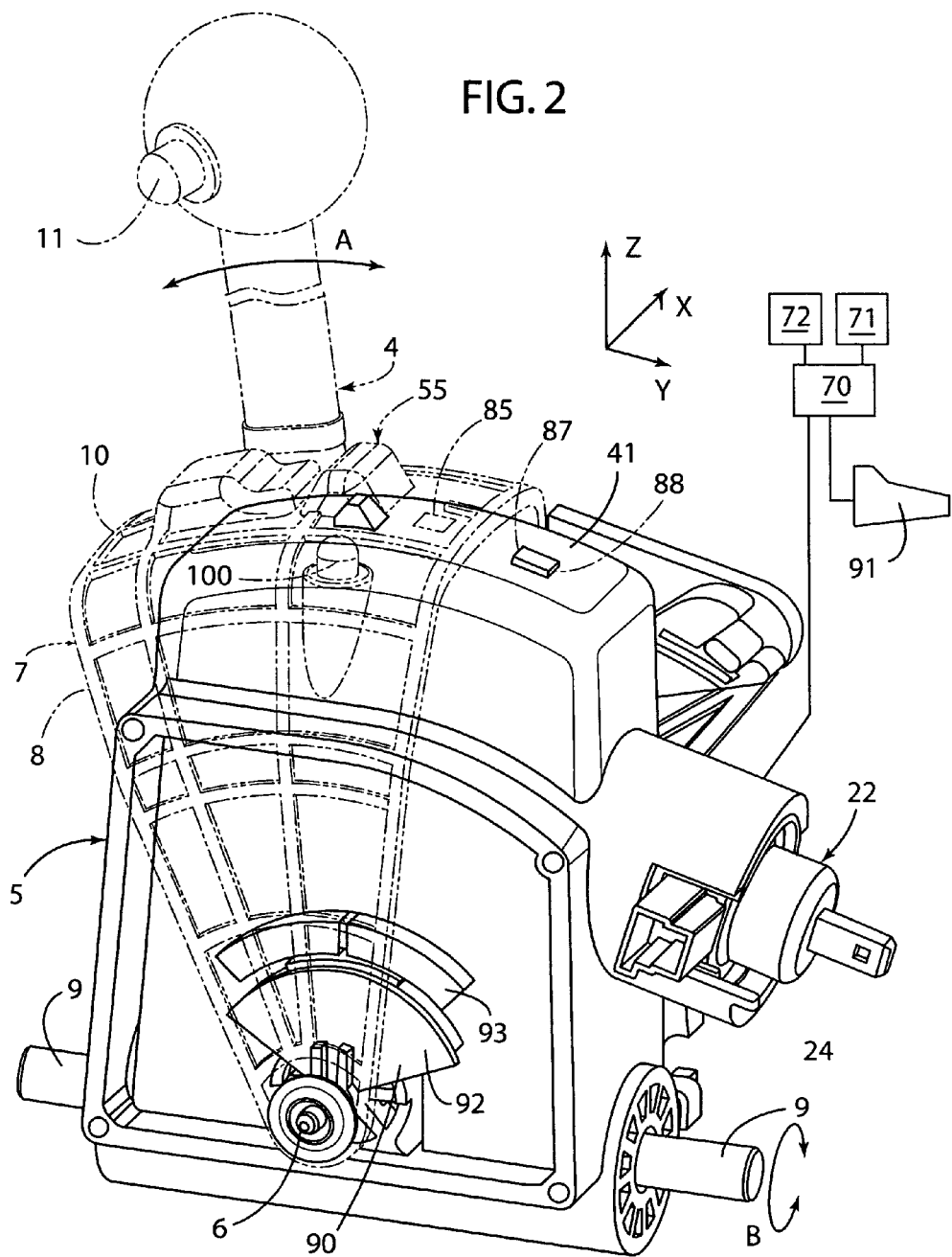
FIG. 2 is a partially fragmentary isometric view of a portion of the shifter of FIG. 1.
Figure 3:
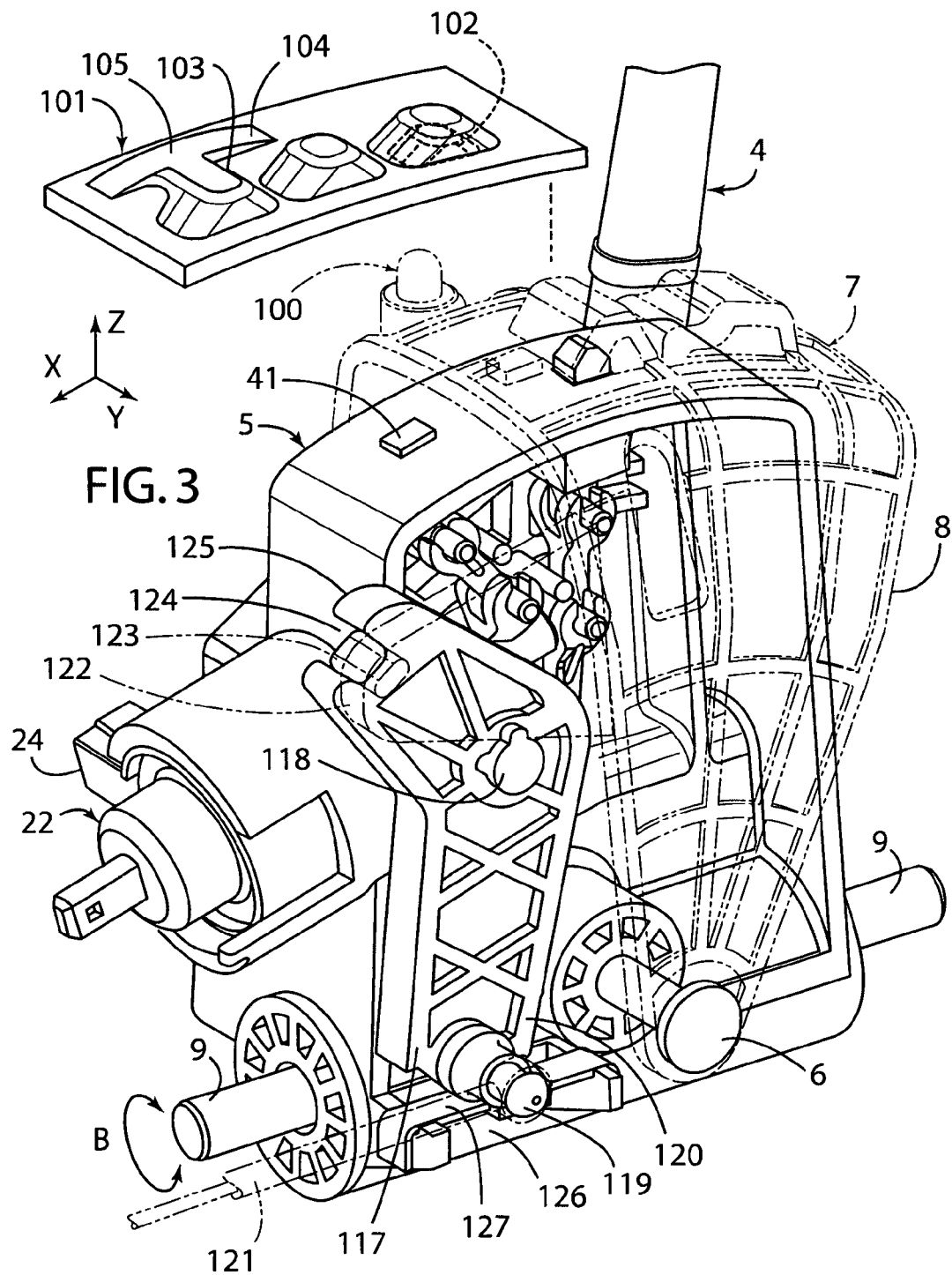
FIG. 3 is a partially fragmentary isometric view of a portion of the shifter of FIG. 1.
Figure 4:
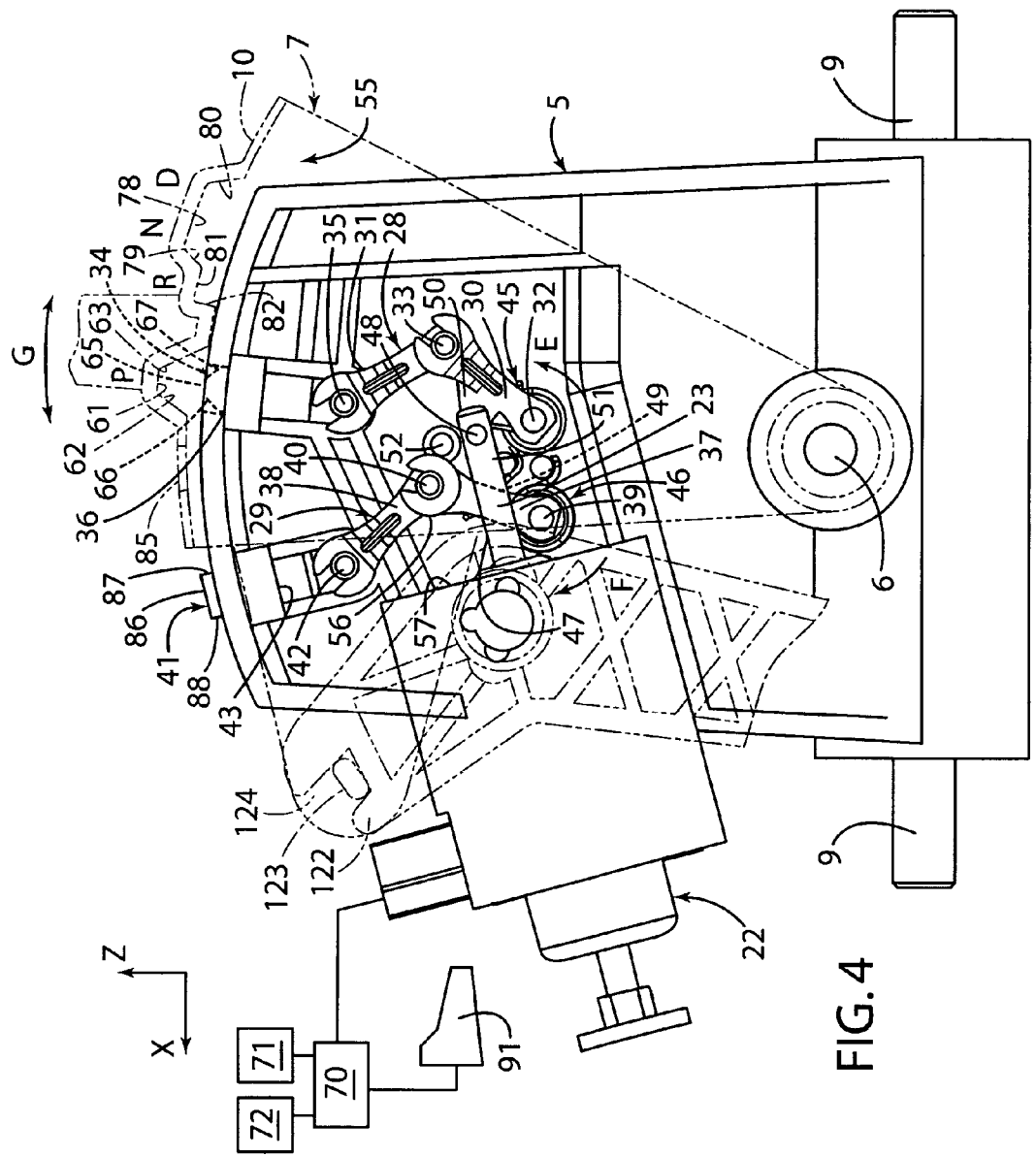
FIG. 4 is a partially fragmentary side view of a portion of the shifter of FIG. 1.

With further reference to FIGS. 2 and 3, an electrically powered actuator 22 is mounted to the support structure 5. Electrically powered actuator 22 is a three-position actuator that is similar to a solenoid, except that actuator 22 includes a permanent magnet that is fixed to movable output member 23 (FIG. 4) of actuator 22, such that output member 23 can be extended or retracted depending upon the direction of the electrical current applied to the coil. The actuator 22 includes one or more springs (not shown) that bias the output member 23 to the intermediate or center position when the actuator 22 is deenergized. Actuator 22 can be energized to extend output member 23 to the position illustrated in FIG. 4. If the actuator 22 is not actuated, the output member will be in the intermediate position illustrated in FIGS. 5 and 5A. Output member 23 may also be retracted to the position illustrated in FIG. 6 if the actuator 22 is energized utilizing electric power of opposite polarity. Actuator 22 includes an electrical receptacle 24 to provide power to the actuator 22 from the vehicle electric power source.

The output member 23 of actuator 22 operably engages a first toggle linkage 28 and a second toggle linkage 29. As discussed in more detail below, first toggle linkage 28 extends and retracts pawl member 34 into and out of engagement with shift gate 55, and second toggle linkage 29 extends and retracts NEUTRAL lock retaining member 41 to provide a NEUTRAL lock.

First toggle linkage 28 includes a first link 30 that is pivotably connected to the support structure 5 at a pivot pin 32, and a second link 31 that is pivotably interconnected to first link 30 at a pivot pin 33. Second link 31 is pivotably connected to a pawl member 34 at a pivot pin 35. Pawl member 34 is slidably received in an opening 36 in support structure 5, such that pawl member 34 extends and retracts linearly in the direction of the arrow "C" (FIG. 5A) when the toggle linkage 28 is moved by output member 23 of solenoid 22.

The second toggle linkage 29 includes a toggle link 37 that is pivotably connected to the base structure 5 at a pivot pin 39. A toggle link 38 is pivotably connected to the toggle link 37 at pivot pin 40, and toggle link 38 is pivotably connected to a movable retaining member 41 at a pivot pin 42. NEUTRAL lock retaining member 41 is slidably received in opening 43 of base structure 5, such that the NEUTRAL lock retaining member 41 translates linearly in the direction of the arrow "D" (FIG. 5A) as the second toggle linkage 29 is moved. A rotary spring 45 rotationally biases first link 30 in the counterclockwise direction as illustrated by arrow "E", and a second rotary spring 46 biases the toggle link 37 of second toggle linkage 29 in the clockwise direction as illustrated by arrow "F" (FIGS. 5 and 5A).

Figure 5:
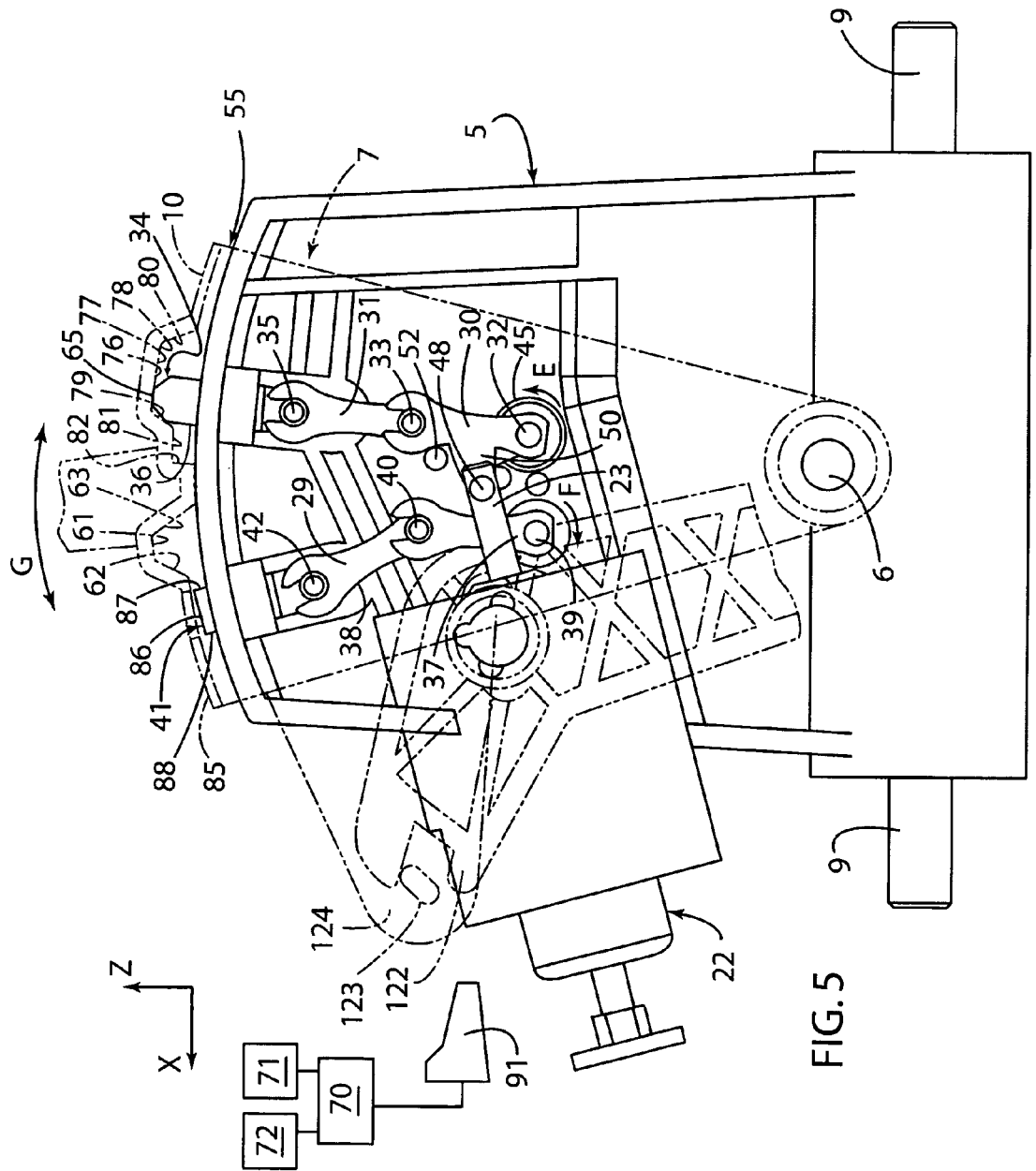
FIG. 5 is an enlarged, fragmentary view of a portion of the shifter of FIG. 1.
Figure 5A:
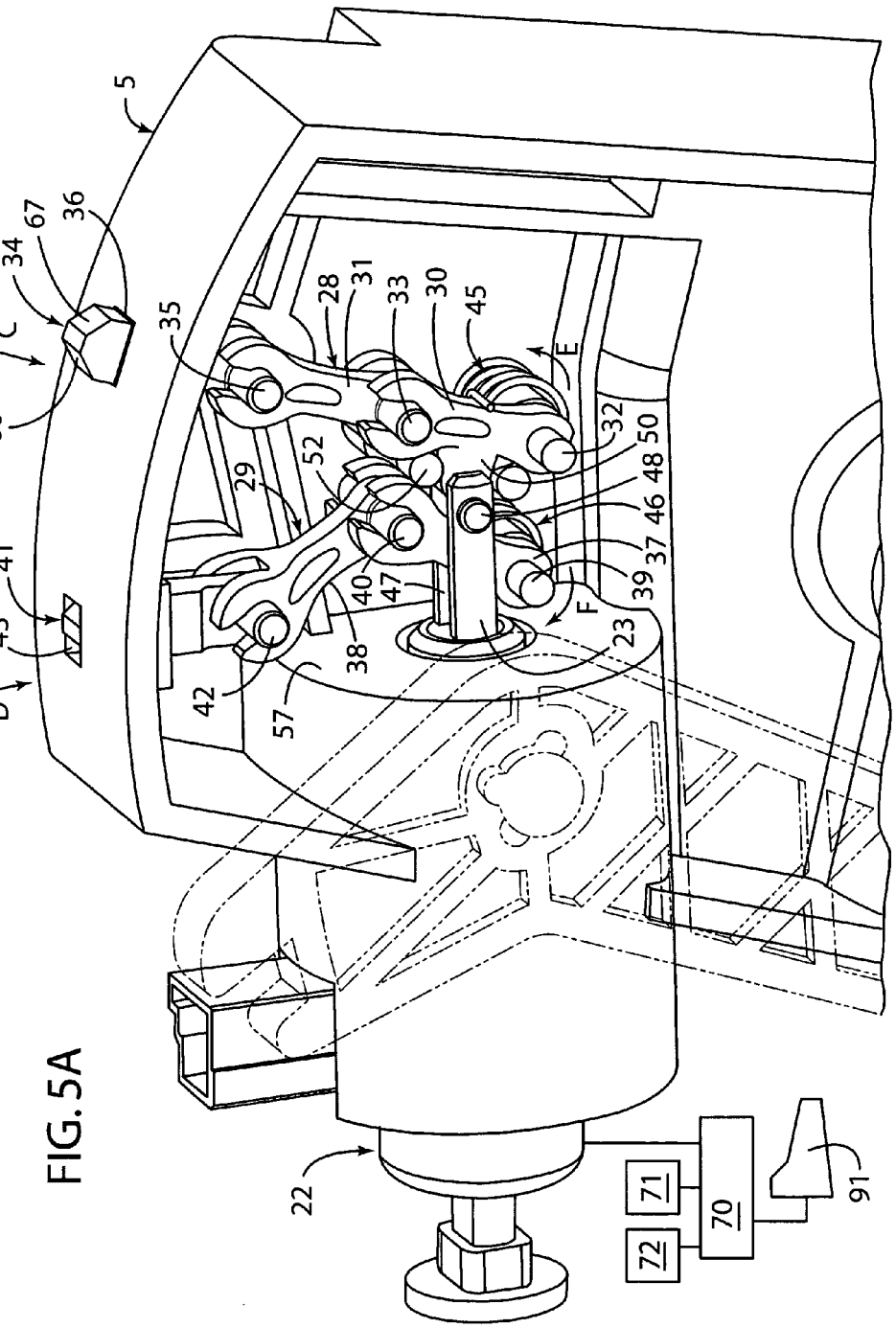
FIG. 5A is a perspective view showing the shifter in the same configuration as in FIG. 5.
Figure 7:
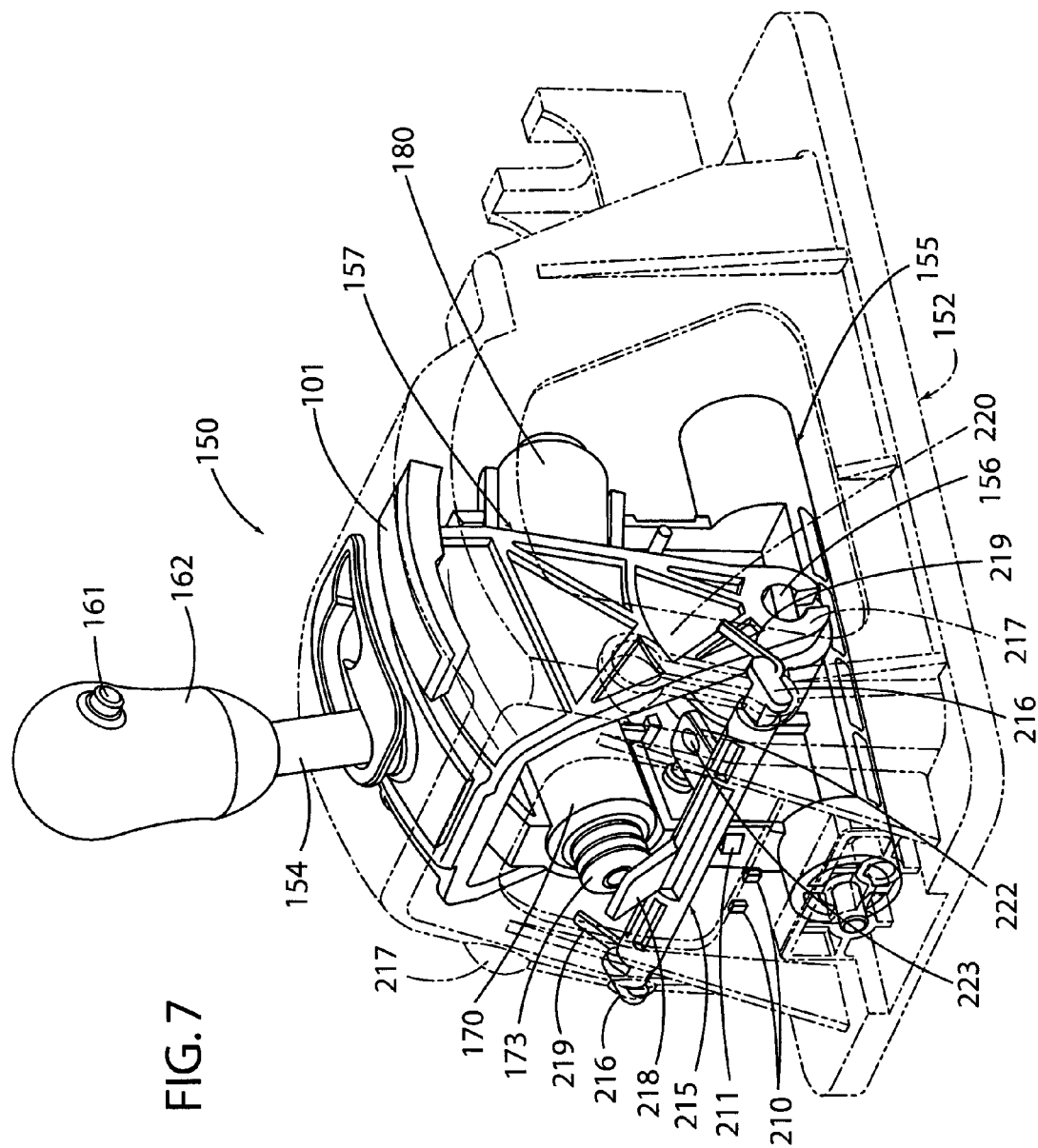
FIG. 7 is a perspective view of a shifter according to another aspect of the present invention.

Thus, pawl member 34 is biased to the extended position illustrated in FIGS. 5 and 5A, and the NEUTRAL lock retaining member 41 is biased to the retracted position illustrated in FIGS. 5 and 5A. Extension and retraction of output member 23 of actuator 22 shifts toggle linkages 28 and 29 from these positions. A stop in the form of a pin 52 extends from support structure 5 between the first toggle linkage 28 and second toggle linkage 29. Stop 52 contacts the side surface 53 of first link 30 of toggle linkage 28 when output member 23 is retracted to thereby retain the toggle linkage 28 in the extended position wherein links 30 and 31 are substantially aligned, with pivot pins 32, 33 and 35 forming a substantially straight line. It will be understood that pin 52 may be configured to permit a small amount of "over rotation" of links 30 and 31 (FIG. 6), such that a force applied to pawl member 34 tending to push pawl member 34 into support structure 5 will cause first link 30 to contact stop pin 52, thereby preventing collapse of toggle linkage 28. Alternately, stop pin 52 may be configured to contact side surface 53 of link 30 such that links 30 and 31 do not rotate far enough to align with one another, such that an inward force acting on pawl member 34 will tend to collapse the linkage 28 to the configuration illustrated in FIG. 4. Because the spring 45 biases link 30 in the counterclockwise direction, stop pin 52 will retain linkage 28 in the extended/locked position illustrated in FIGS. 5 and 5A, unless output member 23 of actuator 22 is extended to collapse the toggle linkage 28 to the configuration illustrated in FIG. 4.

Similarly, spring 46 generates a clockwise force F that biases toggle linkage 29 to the position illustrated in FIGS. 5 and 5A, and side surface 54 of toggle link 37 contacts stop pin 52 to retain the toggle linkage 29 in the collapsed configuration illustrated in FIGS. 5 and 5A, unless the output member 23 is retracted to the position illustrated in FIG. 6. When output member 23 is retracted, side surface 56 of toggle link 37 contacts surface 57 of support structure 5 to thereby retain the second toggle linkage 29 in the locked or extended position as shown in FIG. 6. The surfaces 56 and 57 may be configured such that toggle links 37 and 38 of toggle linkage 29 are retained in a substantially aligned, locked configuration (FIG. 6). Alternately, the surfaces 56 and 57 may be configured to provide a stop wherein toggle links 37 and 38 are over rotated or under rotated slightly when in the locked configuration as discussed above in connection with first toggle linkage 28.

With reference to FIGS. 5A and 6, output member 23 includes a slot 47, and toggle link 37 of second toggle linkage 29 extends through the slot 47. A pin 48 extends transversely across slot 47, and contacts edge surface 49 of toggle link 37 as output member 23 is retracted to thereby rotate the toggle linkage 29 to the extended, straight position illustrated in FIG. 6. First link 30 includes an extension 50 that is received within the end portion of slot 47. The edge surface 51 of extension 50 contacts pin 48 as the output member 23 is extended to the position illustrated in FIG. 4, thereby collapsing the first toggle linkage 28, and retracting pawl member 34.

A shift gate 55 (FIGS. 4 and 5) is formed in the lower surface of central portion 10 of saddle bracket 7. Shift gate 55 includes a PARK notch "P" having a flat base surface 61, and tapered side surfaces 62 and 63. Pawl member 34 has a flat end surface 65 and angled side surfaces 66 and 67. When the pawl member 34 is extended, the pawl member 34 fits closely in the PARK notch P. The engagement of side surfaces 66 and 67 of pawl member 34 with the side surfaces 62 and 63, respectively, of the PARK notch P will generate a force tending to retract pawl member 34 if an external force "G" is applied to the shift lever 4 by a vehicle operator or the like. However, because the first toggle linkage 28 is in the locked configuration when pawl member 34 is extended, the force will not collapse the toggle linkage 28, but rather will be transmitted through the toggle linkage 28 to the pivot pin 32. It will be understood that if the toggle linkage 28 is over rotated slightly, a relatively small side force will be transmitted to the stop pin 52. Also, the angled surfaces 66 and 67 of pawl member 34 and the angled surfaces 62 and 63 of the PARK notch P permit retraction of pawl member 34 upon actuation of actuator 22 even if a relatively large external force G is applied to the shift lever 4.

Shift gate 55 also includes a REVERSE position "R", NEUTRAL position "N" and a DRIVE position "D" that can be engaged by pawl member 34. Flat surface 78 of NEUTRAL position N and DRIVE position D permits the shift lever 4 to be moved between the NEUTRAL and DRIVE positions without retraction of pawl member 34. However, the angled side surface 79 of the NEUTRAL position N prevents movement of the shift lever 4 from the NEUTRAL position N to the REVERSE position R when the pawl member 34 is in the extended position, and the toggle linkage 28 is in the locked position. Similarly, angled surface 80 of DRIVE position D prevents movement of shift lever 4 beyond the DRIVE position D when the pawl member 34 is extended and the toggle linkage 28 is locked. The REVERSE position R of shift gate 55 includes a flat "base" surface 81 and a flat "step" surface 82. The base surface 81 is positioned closer to the pivot 32 of toggle linkage 82 than is the flat surface 78 of the NEUTRAL position N and DRIVE position D. Thus, when the surface 65 of pawl member 34 engages flat surface 81, the toggle linkage 28 will not be fully extended and locked. The torsion spring 45 biases the toggle linkage 28 such that surface 65 of pawl member 34 remains in contact with flat surface 81 of REVERSE position R. When the shift lever 4 is in the REVERSE position, the step surface 82 prevents movement of the shift lever 4 to the PARK position unless the solenoid 22 is actuated to extend output member 23 to thereby retract pawl member 34. However, the shift lever 4 can be moved from the REVERSE position R to the NEUTRAL position N without pushing button 11 to retract pawl member 34. A push button 11 (FIG. 1) on shift lever 4 is operably connected to a controller 70. The controller 70 is also operably connected to a brake sensor 71 and a vehicle speed sensor 72.

Shift lever 4 includes an opening 85 through central portion 10 of saddle bracket 7 adjacent shift gate 55. Movable NEUTRAL lock retaining member 41 selectively engages opening 85 to provide a NEUTRAL lock to thereby lock the shift lever 4 in the NEUTRAL position. As discussed above, rotary spring 46 biases toggle linkage 29 to the unlocked position wherein retaining member 41 is retracted. If actuator 22 is actuated to retract output member 23, output member 23 will contact toggle link 37 and move the toggle linkage 29 to the locked position wherein the NEUTRAL lock retaining member 41 extends into opening 85 to thereby lock the shift lever 4 in the NEUTRAL position. Although the NEUTRAL lock retaining member 41 could have a variety of shapes, in the illustrated example the end 86 of NEUTRAL lock member 41 is rectangular, with straight side surfaces 87 and 88. The straight side surfaces 87 and 88 ensure that the NEUTRAL lock remains engaged with NEUTRAL lock retaining member 41 remaining in the opening 85, even if an external force G is applied to the shift lever 4. Alternately, a NEUTRAL lock retaining member 41A (FIG. 6A) having tapered end surfaces 87A and 88A could be utilized. The tapered surfaces 87A and 88A ensure that the retaining member 41A can retract even if an external load is applied to the shift lever 4.

The NEUTRAL lock is engaged when specified vehicle operating conditions are met, as required by a particular country or vehicle manufacturer. For example, controller 70 may generate a signal to the actuator 22 to engage the NEUTRAL lock (i.e., extend NEUTRAL lock retaining member 41 into opening 85) if the brake pedal sensor 71 indicates that the brake pedal is not depressed, the shift lever 4 is in the NEUTRAL position, and the speed sensor 72 indicates that the vehicle has not been moving for a preselected period of time (e.g., five seconds). Once the NEUTRAL lock has been engaged, controller 70 is programmed to keep the actuator 22 in the retracted position with the NEUTRAL lock retaining member 41 extended into the opening 85 unless certain vehicle operating conditions are met. For example, controller 70 may be programmed to release the NEUTRAL lock (i.e., move output member 23 of actuator 22 from the retracted position) only if the brake pedal sensor 71 indicates that the brake pedal has been depressed, the speed sensor 72 indicates that the vehicle is not moving (or is moving below a predetermined speed), and the push button 11 on shift lever 4 is depressed.

Because the torsion spring 46 provides a biasing force tending to retract the NEUTRAL lock retaining member 41, the NEUTRAL lock will not be activated unless controller 70 provides a signal to the actuator 22 to retract output member 23. In contrast, the torsion spring 45 biases toggle linkage 28 to the locked position, such that pawl member 34 is in the extended, engaged position unless controller 70 generates a signal to actuator 22 to extend the output member 23 and thereby shifts toggle linkage 28 to the broken position and retract pawl member 34. When the actuator 22 is in the deenergized, non-actuated state, output member 23 will be biased to the intermediate position (FIG. 5) by the internal springs (not shown) in actuator 22 and/or the torsion springs 45 and 46, and pawl member 34 will be in the engaged position, and NEUTRAL lock retaining member 41 will be in the retracted position. Alternately, leaf springs 185 and 186, disclosed in more detail below in connection with the shifter of FIG. 8, may be used instead of torsion springs 45 and 46. In this way, a single actuator 22 can be utilized to provide the required gear position controls via pawl member 34, and also provide a NEUTRAL lock function. Furthermore, when pawl member 34 is engaged in the PARK notch 60, a PARK lock function can be provided. Controller 70 may be programmed to actuate actuator 22 to extend output member 23 if the shift lever 4 is in the PARK position only if brake pedal sensor 71 indicates that the brake pedal is depressed, the push button 11 is depressed, and the vehicle ignition is in the on/run position.

With reference back to FIGS. 1 and 2, shifter 1 includes a rotational sensor 90 configured to determine the angular position of the shift lever 4 as it rotates fore and aft about the pivot 6. The rotational sensor 90 is operably connected to the controller 70, and the controller 70 provides a signal to the transmission 71. Sensor 90 includes a first part 92 that is secured to the downwardly extending portion 8 of saddle bracket 7 of shifter 4, and a second part 93 that is fixed to the support structure 5. A conventional hall sensor 95 is mounted on support structure 5 to sense the position of the support structure 5 as it is rotated side-to-side about the pins 9 (X-axis) as shift lever 4 moves laterally through central portion 19 of opening 15 from the first portion 17 of opening 15 (i.e., automatic shift lane) and the second portion 18 of opening 15 (i.e., manual, or up/down shift lane). A pair of horizontally spaced-apart magnets 96A, 96B are mounted to base structure 2 adjacent sensor 95 to thereby enable sensor 95 to determine if shift lever 4 and support structure 5 are rotated to the left or right. The sensor 95 is also operably connected to the controller 70. A conventional microswitch or other suitable sensor could also be utilized to provide controller 70 with a signal indicating if the lever 4 is in the automatic or manual shift lane.

During operation, as the shift lever 4 is moved along the automatic shift lane 17, the sensor 90 provides a signal to the controller 70, and the controller 70 provides a signal to the transmission 91 corresponding to the position of the shift lever 4. When the shift lever 4 is moved from the DRIVE position to the manual shift lane 18, the sensor 95 provides a signal to the controller 70 indicating that the shift lever 4 is in the manual shift lane. If the shift lever 4 is moved forward in the manual shift lane 18, sensor 70 provides a signal to the transmission 91 to upshift by one gear. If shift lane 18 includes a "++" position, controller 70 will upshift transmission 91 two gears each time lever 4 is moved into the "++" gear position. Conversely, if the shift lever 4 is moved back in manual shift lane 18, controller 70 provides a signal to downshift transmission 91 by one gear position. If shifter 1 includes a "--" gear position, transmission 91 is downshifted two gears each time shift lever 4 is moved to the "--" position. Manual shift lane 18 could also include other configurations. For example, a timer could be integrated such that holding the shifter in the "+" position for a predetermined time (e.g., 2 seconds) would upshift to the highest gear. Conversely, holding the shift lever 4 in the "−" position would downshift the transmission to the lowest gear.

It will be understood that controller 70 may be programmed to prevent upshift or downshift depending upon vehicle operating conditions. For example, if downshifting would cause the engine to exceed the maximum allowable rpms, controller 70 may "override" the downshift command generated by the operator shifting the shift lever 4 to the downshift position. With reference to FIG. 5, it will be understood that when the shift lever 4 is in the DRIVE position, the side surface 67 of pawl member 34 is spaced apart from angled surface 80 of the shift gate 55. Thus, when the shift lever 4 is moved to the manual lane, the shift lever 4 can be moved back to the downshift position without interference from the pawl member 34. Similarly, the space between angled side surface 66 of pawl member 34 and the angled surface 79 of shift gate 55 permits the shift lever 4 to be moved forward to the upshift position when the shift lever 4 is in the manual shift lane. Thus, when the shift lever 4 is in the automatic shift lane 17, the fore-aft movement of the shift lever 4 is restricted by the first portion 17 of opening 15, and the fore-aft movement of the shift lever 4 is limited by the shape of the second portion 18 of opening 15 when shift lever 4 is in the manual shift lane.

With reference to FIG. 3, a plunger 100 is biased upwardly by a spring into a detent 101 having a plurality of downwardly facing indentations 102, each of which correspond to a gear position (i.e., PARK, REVERSE, NEUTRAL, and DRIVE). The indentations 102 retain the shift lever 4 in the selected gear position and also provide tactile feedback for the operator. The detent member 101 also includes a transverse indentation 103 for side-to-side movement of shift lever 4 from the automatic shift lane to the manual shift lane and vice versa. An enlarged indentation 104 extends fore-aft. The plunger 100 engages the large indentation 104 when the shift lever 4 is in the manual shift lane. The enlarged indentation 104 has a shallow "V" shape that is deepest at the center 105 such that the contact of plunger 100 on indentation 104 provides a centering action tending to push the shift lever 4 to the center position when the shift lever 4 is in the manual shift lane.

With reference back to FIG. 1, shifter 1 also includes a manual PARK lock or NEUTRAL lock release device. An L-shaped lever 110 is pivotably mounted to the base structure 2 for rotation about an axis 111. A downward force "R" may be applied to forward end 112 of lever 110, thereby rotating the lever 110 about the axis 111 such that the end 113 of lever 110 shifts forward and pushes inwardly on movable solenoid member 114, thereby manually extending the output member 23 of solenoid 22 to shift the toggle linkage 28 to the broken position and thereby retract pawl member 34 from the PARK notch 60 of shift gate 55. A slidable plunger 115 or the like is slidably connected to the base structure 2, such that the plunger 115 can be pushed downwardly into the forward end 112 of lever 110 to manually release the pawl member 34. Alternately, a small opening or the like (not shown) can be provided in the cover 20, such that a screwdriver or the like can be inserted into engagement with end 112 of L-lever 110 to release the pawl. The plunger 115 or opening may be covered by a lockable door or the like (not shown), such that the PARK lock cannot be manually disengaged except by persons having a key to the lockable cover.

With reference to FIG. 3, an arm 117 is pivotally mounted to the support structure 5 by a pivot 118. A connector 119 at lower end 120 of arm 117 is connected to a cable 121 that is mechanically connected to the transmission to mechanically shift the transmission into and out of the PARK position. An extension 122 extends rearwardly from the saddle bracket 7, and includes a transverse pin 123 that engages a slot 124 in upper end 125 of arm 117. When the shift lever 4 is in the position illustrated in FIG. 3, the pin 123 engages slot 124, such that cable 121 is shifted rearwardly to thereby mechanically shift the transmission to the PARK position. As the shift lever is moved rearwardly, out of the PARK position, the pin 123 slides out of slot 124, such that shift lever 4 is mechanically disconnected from arm 117. Also, as shift lever 4 is moved from the PARK position, thereby rotating arm 117, lower end 120 of arm 117 moves forwardly across a raised center detent member 126 on spring 127. The forward shifting of cable 121 mechanically releases the transmission from the PARK position, and the spring 127 and detent 126 retain the arm 117 in position after the shift lever 4 is moved out of the PARK position, and the pin 123 is disengaged from slot 124. In this way, the shifter 1 provides a mechanical PARK feature if required for a particular transmission, while providing an electronic "shift by wire" shifting arrangement when the shifter is not in the PARK position.

A shifter 150 according to another aspect or embodiment of the present invention is illustrated in FIGS. 7-10. Shifter 150 is somewhat similar to shifter 1 described above, and is operably connected to a controller 70, sensors 71, 72, and a transmission 90. However, unlike shifter 1, shifter 150 includes a first two position electrical actuator 170 and a second two position electrical actuator 180 rather than the single three position actuator 22 of shifter 1. Actuator 170 acts on first linkage 171 to selectively extend and retract a pawl member 175, and second electrical actuator 180 acts on a second linkage 181 to selectively extend and retract a NEUTRAL lock retaining member 176 to provide a NEUTRAL lock function. The electrical actuators 170 and 180 may be either a voice coil or a solenoid having at least two operating positions, or a coil repelling a permanent magnet. In the illustrated example, the actuators 170 and 180 are coils/magnets. Examples of this type of actuator is disclosed in U.S. Pat. Nos. 5,677,658; 5,718,312; and 5,759,132, which are incorporated by reference. Shifter 150 includes a shift lever 154 that is rigidly mounted to a saddle bracket 157. The saddle bracket rotates in a fore-aft manner about pivot 156, and support structure 155 rotates in a side-to-side manner about pivot pins 159 which are pivotably connected to the base structure 152.

Figure 8:
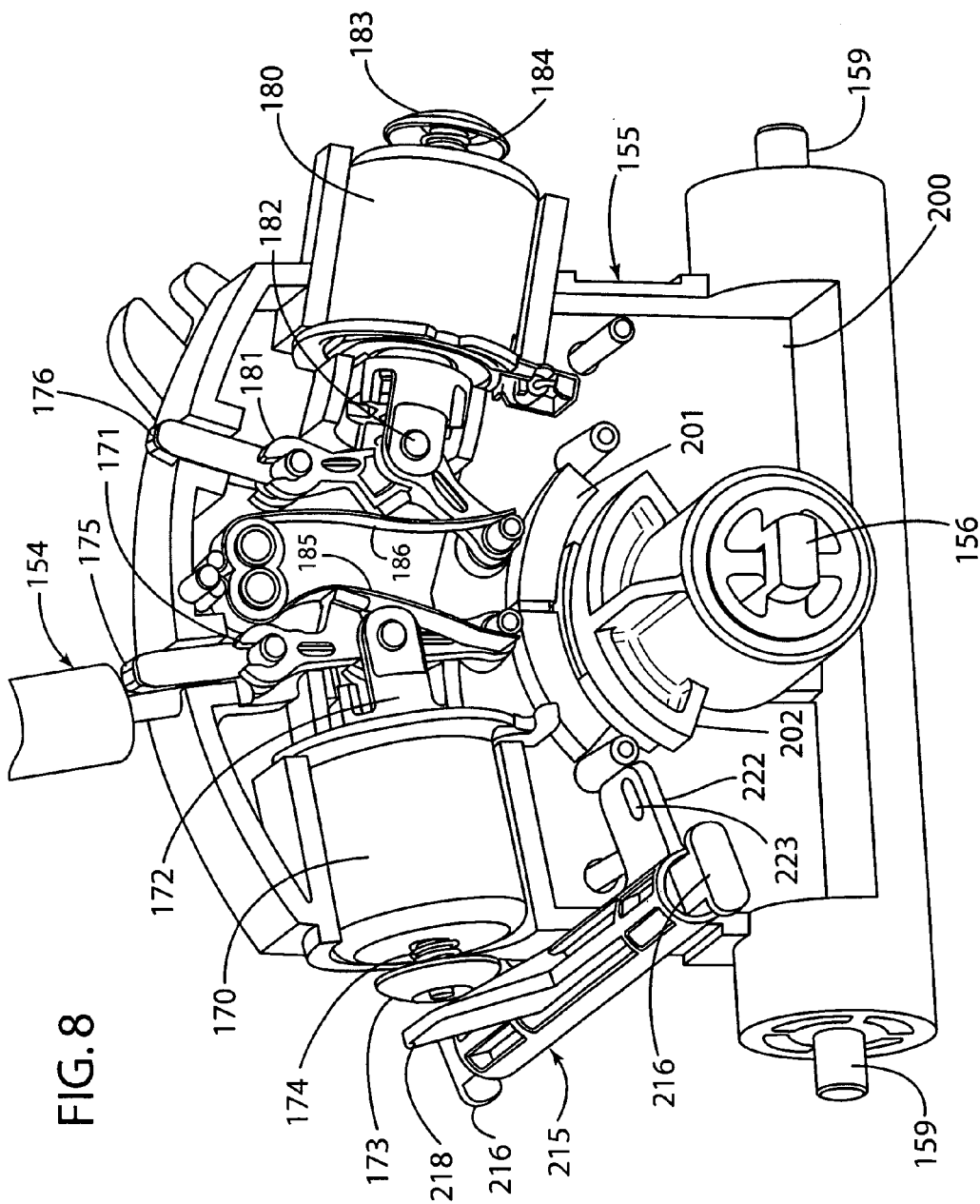
FIG. 8 is a partially fragmentary perspective view of the shifter of FIG. 7.

With reference to FIG. 8, a leaf spring 185 biases output member 172 of electrical actuator 170 inwardly towards actuator 170, such that pawl member 175 is extended into engagement with the shift gate (not shown) unless an electrical current tending to extend output member 172 of actuator 170 is applied. It will be understood that shifter 150 includes a shift gate (not shown) that is substantially the same as shift gate 55 described above in connection with shifter 1. A leaf spring 186 biases output member 182 of electrical actuator 180 inwardly towards actuator 180, such that NEUTRAL lock retaining member 176 is biased into the retracted/disengaged position, and is only extended if electrical actuator 180 is actuated. Springs 185 and 186 may be formed as a single U-shaped spring. Electrical actuator 170 includes a button member 173 that is connected to a plunger 177 (see also FIG. 9), and a spring 174 acts against the housing 178 in a manner that tends to bias button member 173 outwardly. Similarly, electrical actuator 180 includes a button member 183 and spring 184 that biases button member 183 outwardly. Springs 174 and 184 may be eliminated if springs 185 and 186 have sufficient stiffness. Also, torsion springs such as springs 45 and 46 (FIG. 4) may be utilized instead of leaf springs 185, 186 and coil springs 174, 184.

Figure 9:
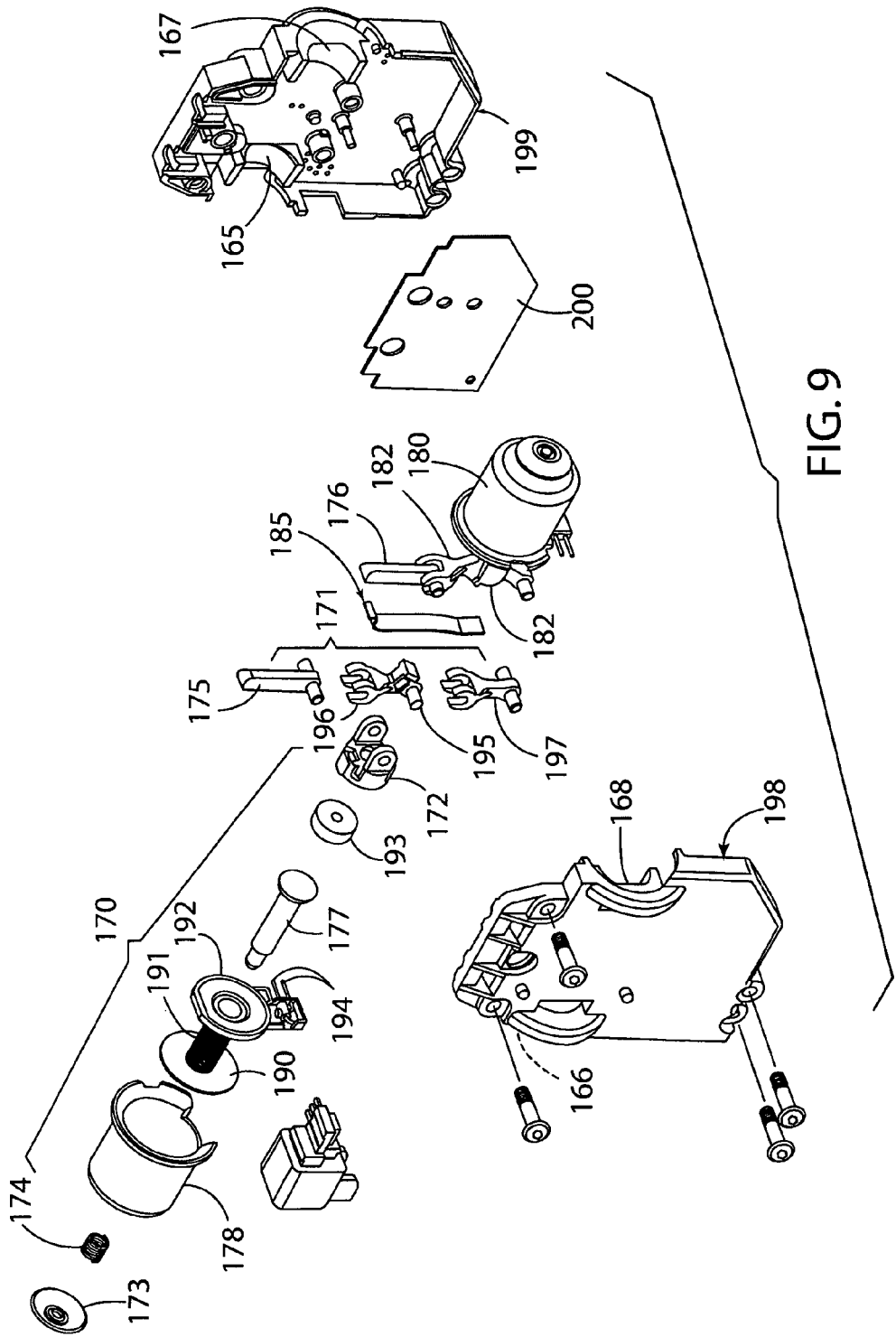
FIG. 9 is an exploded perspective view of a portion of the shifter of FIG. 7.

Electrical actuators 170 and 180 are substantially identical, such that only actuator 170 will be described in detail. As illustrated in FIG. 9, actuator 170 includes a bobbin 190 having an opening 192 therethrough and a coil 191. A pair of electrical contacts 194 are electrically coupled to the coil 191 to provide energizeration of the coil 191. Plunger 177 is slidably received in the opening 192 when actuator 170 is assembled. A permanent magnet 193 is molded into output member 172. When an electrical current is applied to coil 191, a magnetic field repelling magnet 193 is produced, thereby shifting output member 172 away from coil 191. When assembled, button member 173 is connected to plunger 177. Application of an inward force on button member 173 causes plunger 177 to push against magnet 193 and output member 172, thereby manually shifting output member 172. However, because magnet 193 is not connected to plunger 177, an outward force on button member 173 by, for example, spring 174, will not retract output member 172. Thus, leaf spring 185 and 186 (or torsion spring 45) acting on the toggle linkage 171 is utilized to retract output member 172. Similarly, leaf spring 186 (or torsion spring 46) biases output member 182 to the retracted position. Output member 172 is in the form of a clevis that engages pin 195 of a link 196. Link 196 is rotatably connected to link 197 at pin 195 when assembled. The electrical actuators 170 and 180, and the first linkage 171 and second toggle linkage 182 are mounted in a housing including a first half 198 and a second half 199. When assembled, output member 172 is loosely guided by cylindrical surfaces 165 and 166, and output member 182 is loosely guided by cylindrical surfaces 167 and 168.

A circuit board 200 may be mounted in the housing, and a rotary position sensor 201 (FIG. 8) may be mounted on the circuit board 200. A second part 202 of the sensor is fixed to the saddle bracket 157, and therefore rotates relative to the sensor part 201 about a pivot 156 as the shift lever 4 is rotated in a fore-aft direction. In this way, the sensor generates a signal to the controller indicating the rotary fore-aft position of the lever 4.

With reference back to FIG. 7, side-to-side rotary position sensor includes a pair of magnets 210 that are mounted on the base structure 152. A hall effect sensor or switch 211 is mounted on support structure 155 directly adjacent the magnets 210, such that the sensor 211 generates a signal corresponding to the side-to-side position of the shift lever 154 as the support structure 155 is rotated about the pivot pins 159. A conventional microswitch or other suitable sensor could also be utilized to provide the controller with a signal indicating the side-to-side position of lever 154.

The shifter 150 operates in a similar manner to the shifter 1 described in detail above. Saddle bracket 157 includes a shift gate and a NEUTRAL lock opening that are substantially similar to the shift gate 55 and opening 85, respectively, described in detail above in connection with shifter 1. Shifter 150 also includes a detent 101 that is substantially similar to the detent 101 of shifter 1 described above.

During operation, the controller provides a NEUTRAL lock as follows. The controller actuates electrical actuator 180 if the vehicle is not moving, the brake pedal has not been depressed for a preselected length of time (e.g., 5 or 10 seconds), and the shifter is in the NEUTRAL position. Actuation of electrical actuator 180 causes the linkage 181 to shift to the locked position illustrated in FIG. 8 wherein NEUTRAL lock retaining member 176 is extended into the locked position. In the locked position, member 176 engages the opening in saddle bracket 157 to lock the shift lever 154 in the NEUTRAL position. The controller is programmed to require that the brake pedal be depressed before the controller will disengage NEUTRAL lock retaining member 176 and thereby permit movement of the shift lever. Electrical actuator 170 can be actuated by pushing on button 161 on shift knob 162, thereby retracting output member 172 and also retracting pawl 175 to permit movement of shift lever 154 while in the automatic shift lane. It will be understood that, in the illustrated example, shifter 150 has substantially the same shift pattern as the shifter 1 described in detail above and illustrated in FIG. 1A. However, shifters 1 and 150 may utilize a variety of shift patterns. For example, the manual shift lane could be omitted, such that only an automatic shift lane is utilized.

Shifter 150 includes a manual PARK lock release member 215 (FIGS. 7 and 8) that is rotatably mounted to the mounting structure 152. The release member 215 includes oblong ends 216 that may be received in keyhole-shaped openings 217 in base structure 152 to thereby pivotably mount the release member 215 to the structure 152. Release member 215 includes a tab 218 that contacts the button member 173 of electrical actuator 170 to push the button member 173 forward, thereby shifting the output member 172 outwardly to shift the linkage 171 and retract pawl member 175. A flexible arm 219 (FIG. 7) contacts an edge surface 220 of base structure 152 to thereby rotatably bias the release member 215 in a manner that tends to disengage tab 118 from button member 173. An extension 222 of release member 215 includes an opening 223. A slidable plunger (not shown) or a screwdriver or the like may be manually pushed into the opening 223 of extension 222 to thereby rotate the release member 215 and shift the output member 172 of electrical actuator 170 to the extended position to thereby retract the retaining member 175.

Figure 10:
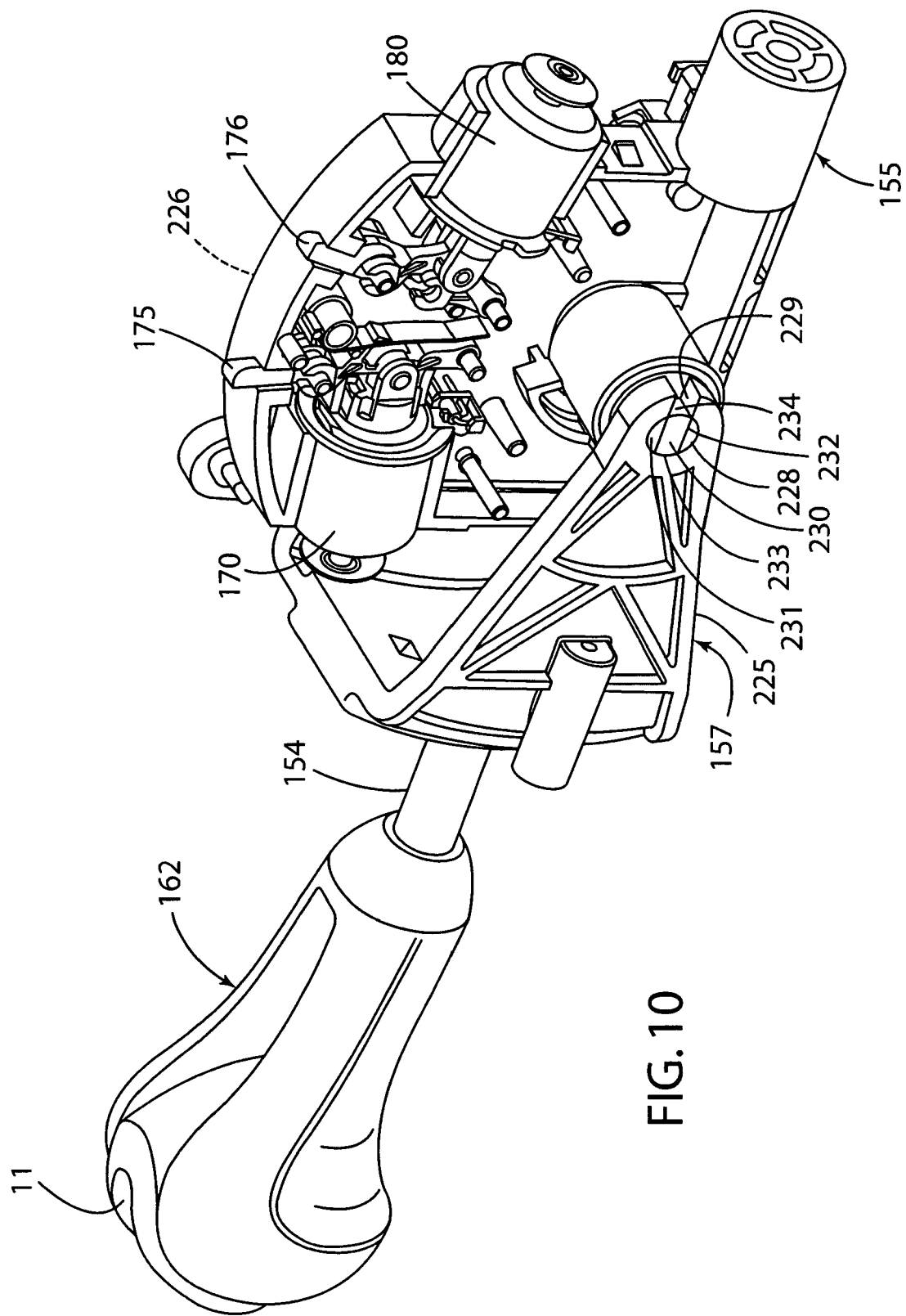
FIG. 10 is a perspective view of a portion of the shifter of FIG. 7.

With further reference to FIG. 10, saddle bracket 157 includes spaced-apart downwardly extending portions 225 and 226. The extension 225 is shown in FIG. 10, and it will be understood that the saddle bracket 157 is substantially symmetrical, such that extension 226 is a mirror image of extension 225. Extension 225 includes an opening 227 including a substantially cylindrical wall portion 228 and a slot or open portion 229. Extension 230 of support structure 155 has an oblong shape, with flat side surfaces 231 and 232, that permit the saddle bracket 157 and shift lever 154 to be slid onto the extensions 230 when the saddle bracket 157 and shift lever 154 are in the position illustrated in FIG. 10. The shift lever 154 is then rotated upwardly into the operational position, such that radiused end surfaces 233 and 234 of extension 230 rotatably engage the cylindrical surface 228 of saddle bracket 157. In this way, the saddle bracket 157 and shift lever 154 can be quickly and easily assembled to the support structure 155. Also, the combination of the rotating support structure 155 mounted on base structure 152 and the saddle bracket 157 provide a very compact yet durable arrangement that can be utilized to provide for a wide variety of shift patterns and applications.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shifter for controlling a transmission of a vehicle, the shifter comprising:
   a support structure;
   a shift lever movably mounted to the support structure for movement between a plurality of control positions, wherein at least one of the control positions comprises a NEUTRAL position;
   a shift gate having a plurality of notches corresponding to the control positions, the shift gate positioned on a selected one of the support structure and the shift lever;
   a movable pawl member selectively engaging the notches of the shift gate to restrict movement of the shift lever relative to the support structure, the pawl member being biased into engagement with the shift gate;
   a movable retaining member selectively interconnecting the shift lever and the support structure when in an engaged position to retain the shift lever in the NEUTRAL position, wherein the retaining member is biased to a disengaged position wherein the retaining member does not retain the shift lever in the NEUTRAL position;
   a powered actuator operably interconnected to the pawl member and the retaining member; and wherein:
   the powered actuator operably engages the movable pawl member and shifts the movable pawl member out of engagement with the shift gate when actuated in a first manner, the powered actuator operably engaging the movable retaining member and shifting the retaining member to the engaged position to retain the shift lever in the NEUTRAL position when the powered actuator is actuated in a second manner.

2. The shifter of claim 1, wherein:
the powered actuator includes a movable output member that shifts between a first position, a second position, and a third position.

3. The shifter of claim 2, wherein:
the movable output member of the powered actuator is biased into the second position.

4. The shifter of claim 3, wherein:
the movable output member translates linearly between the first, second, and third positions.

5. The shifter of claim 4, wherein:
the second position comprises an intermediate position that is between the first and third positions.

6. The shifter of claim 5, wherein:
the powered actuator comprises a coil and a permanent magnet connected to the movable output member and having at least one spring biasing the movable output member to the second position.

7. The shifter of claim 1, including:
a first toggle linkage having first and second toggle links pivotably interconnected to one another, and wherein the first toggle link is pivotably connected to the support structure base, and the second toggle link is pivotably connected to the movable pawl member.

8. The shifter of claim 7, including:
a second toggle linkage having third and fourth toggle links pivotably interconnected to one another, and wherein the third toggle link is pivotably connected to the support structure base, and the fourth toggle link is pivotably connected to the movable retaining member.

9. The shifter of claim 8, wherein:
the third and fourth toggle links define centerlines, and the second toggle linkage defines a an engaged position wherein the movable retaining member engages the shift gate and wherein the centerlines of the third and fourth toggle links are substantially aligned, and a broken position wherein the movable retaining member is disengaged from the shift gate;
the second toggle linkage is biased out of the engaged position;
the support structure base including a first stop limiting motion of the third and fourth toggle links when the second toggle linkage is in the center position and the movable output member is in the first position.

10. The shifter of claim 9, wherein:
the first and second toggle links define centerlines, and the first toggle linkage defines an engaged position wherein the pawl member engages the shift gate, and wherein the centerlines of the first and second toggle links are substantially aligned, and a broken position wherein the pawl member is disengaged from the shift gate;

the first toggle linkage is biased towards the engaged position;

the support structure base including a second stop limiting movement of the first and second toggle links and retaining the pawl member in the engaged position when the movable output member is in the first and second positions.

11. The shifter of claim 10, wherein:

the powered actuator comprises a solenoid having a movable output member that is movable to extended and retracted positions upon actuation of the solenoid and an intermediate position between the extended and retracted positions, and wherein the output member is biased towards the intermediate position.

12. The shifter of claim 1, wherein:

the shift gate and shift lever are pivotably interconnected to the base, and the powered actuator is fixedly mounted to the base.

13. The shifter of claim 1, wherein:

the shift lever is movable between an automatic shift lane having at least PARK and REVERSE gear positions and a manual shift lane having upshift and downshift gear positions.

14. The shifter of claim 1, including:

a base; and wherein the support structure is movably mounted to the base.

15. A shifter for controlling a transmission of a vehicle, the shifter comprising:

a support structure;

a shift member movably associated with the support structure, wherein the shift member is movable to a plurality of transmission control positions including at least a NEUTRAL transmission control position;

a shift gate defining a plurality of gear control positions; and a powered pawl mechanism that retains the shift member in the NEUTRAL position when actuated in a first manner, and disengages from the shift gate when actuated in a second manner; the powered pawl mechanism including a first toggle linkage and a movable pawl member connected to the first toggle linkage, wherein the first toggle linkage is biased towards an engaged configuration wherein the pawl member engages the shift gate, and collapses to a retracted position wherein the pawl member is disengaged from the shift gate when the powered pawl mechanism is actuated in the second manner; and wherein:

the powered pawl mechanism includes a second toggle linkage and a movable retaining member connected to the second toggle linkage, wherein the second toggle linkage is biased away from an engaged configuration wherein the retaining member interconnects the shift member and the support structure and retains the shift member in the NEUTRAL position to a disengaged position wherein the retaining member permits movement of the shift member out of the NEUTRAL position.

16. The shifter of claim 15, wherein:

the powered pawl mechanism includes a coil and a permanent magnet engaging a movable output member that shifts inwardly to a retracted position upon actuation of the solenoid in a first manner, and shifts outwardly to an extended position upon actuation of the solenoid in a second manner;

the movable output member causing the first toggle linkage to collapse to the retracted configuration upon actuation of the powered pawl mechanism in the second manner, and causing the second toggle linkage to extend to the engaged configuration upon actuation of the powered pawl mechanism in a first manner.

17. A shifter for controlling a transmission of a vehicle, the shifter comprising:

a support structure;

a shift member movably associated with the support structure, wherein the shift member is movable to a plurality of positions including at least a NEUTRAL transmission control position and a DRIVE transmission position;

a shift gate defining a plurality of positions including at least a DRIVE position;

a powered pawl mechanism including a powered actuator and a retaining member operably connected to the powered actuator, and a pawl member operably connected to the powered actuator, wherein the retaining member is movable between an engaged position wherein the shift member is retained in the NEUTRAL transmission control position, and a retracted position permitting movement of the shift member relative to the support structure; wherein the pawl member is movable between an engaged position wherein the pawl member engages the shift gate to control movement of time shift member relative to the support structure, and a disengaged position wherein the pawl member is substantially disengaged from the shift gate; and wherein:

the retaining member moves upon actuation of the powered actuator in first manner, and the pawl member moves upon actuation of the powered actuator in a second manner; and the powered pawl mechanism includes a movable output member that shifts in a first direction when actuated in the first manner, and shifts in a second direction when actuated in the second manner; and wherein:

the powered pawl mechanism includes a first toggle linkage and the movable pawl member connected to the first toggle linkage, wherein the first toggle linkage is biased towards an engaged configuration wherein the pawl member engages the shift gate, and collapses to a retracted position wherein the pawl member is disengaged from the shift gate when the powered pawl mechanism is actuated in the second manner.

18. The shifter of claim 17, wherein:

the powered pawl mechanism includes a second toggle linkage and a movable retaining member connected to the second toggle linkage, wherein the second toggle linkage is biased away from an engaged configuration wherein the retaining member interconnects the shift member and the base structure and retains the shift member in the NEUTRAL position to a disengaged position wherein the retaining member permits movement of the shift member out of the NEUTRAL position.

19. The shifter of claim 18, wherein:

the powered pawl mechanism includes a coil and a permanent magnet engaging a movable output member that shifts inwardly to a retracted position upon actuation of the solenoid in a first manner, and shifts outwardly to an extended position upon actuation of the solenoid in a second manner;

the movable output member causing the first toggle linkage to collapse to the retracted configuration upon actuation of the solenoid in the second manner, and causing the second toggle linkage to extend to the engaged configuration upon actuation of the solenoid in a first manner.

20. The shifter of claim 19, including:

a stop that retains the first toggle linkage in the engaged configuration when the powered actuator is not actuated in the second manner.

* * * * *